Patented Aug. 15, 1944

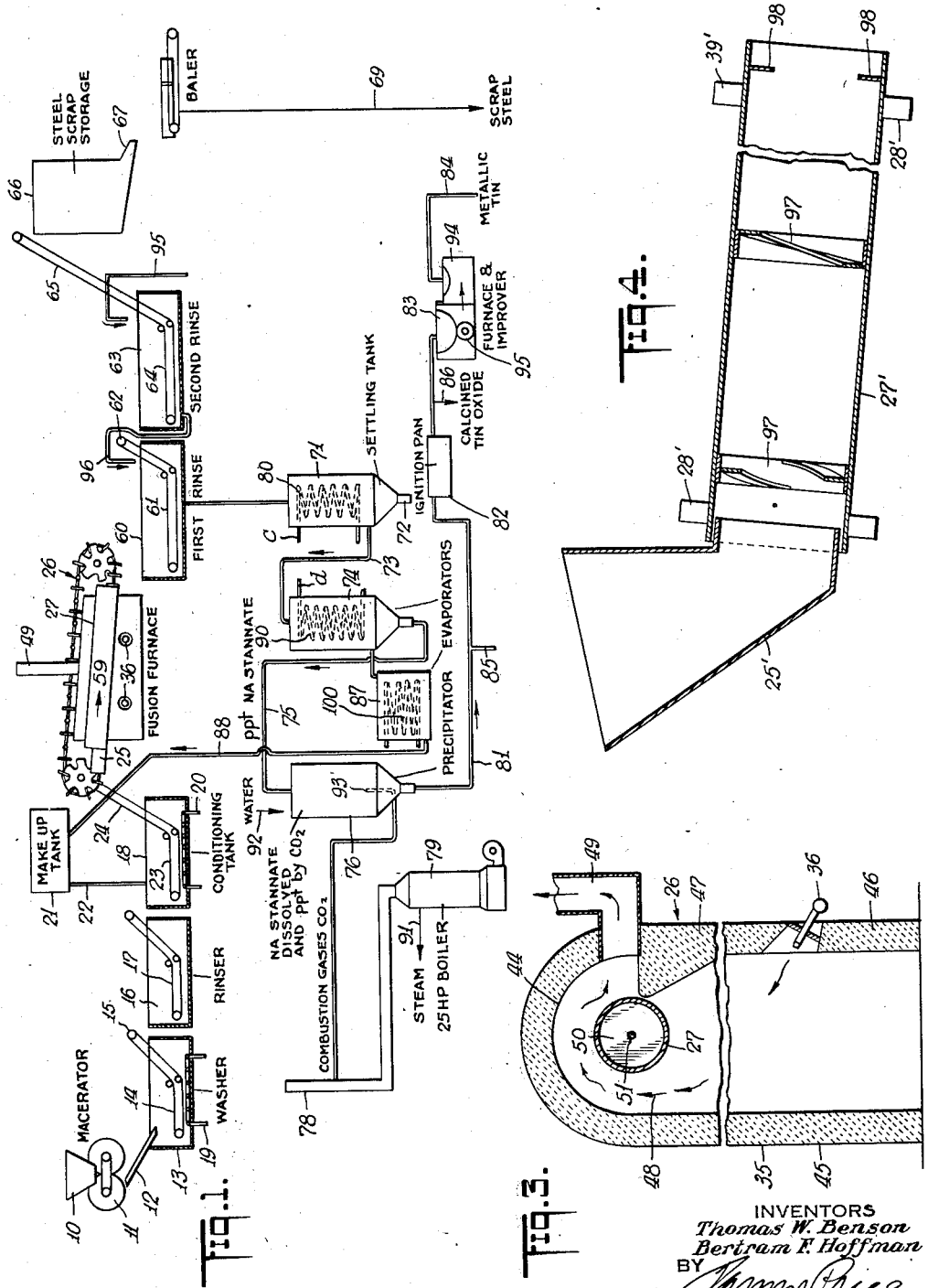

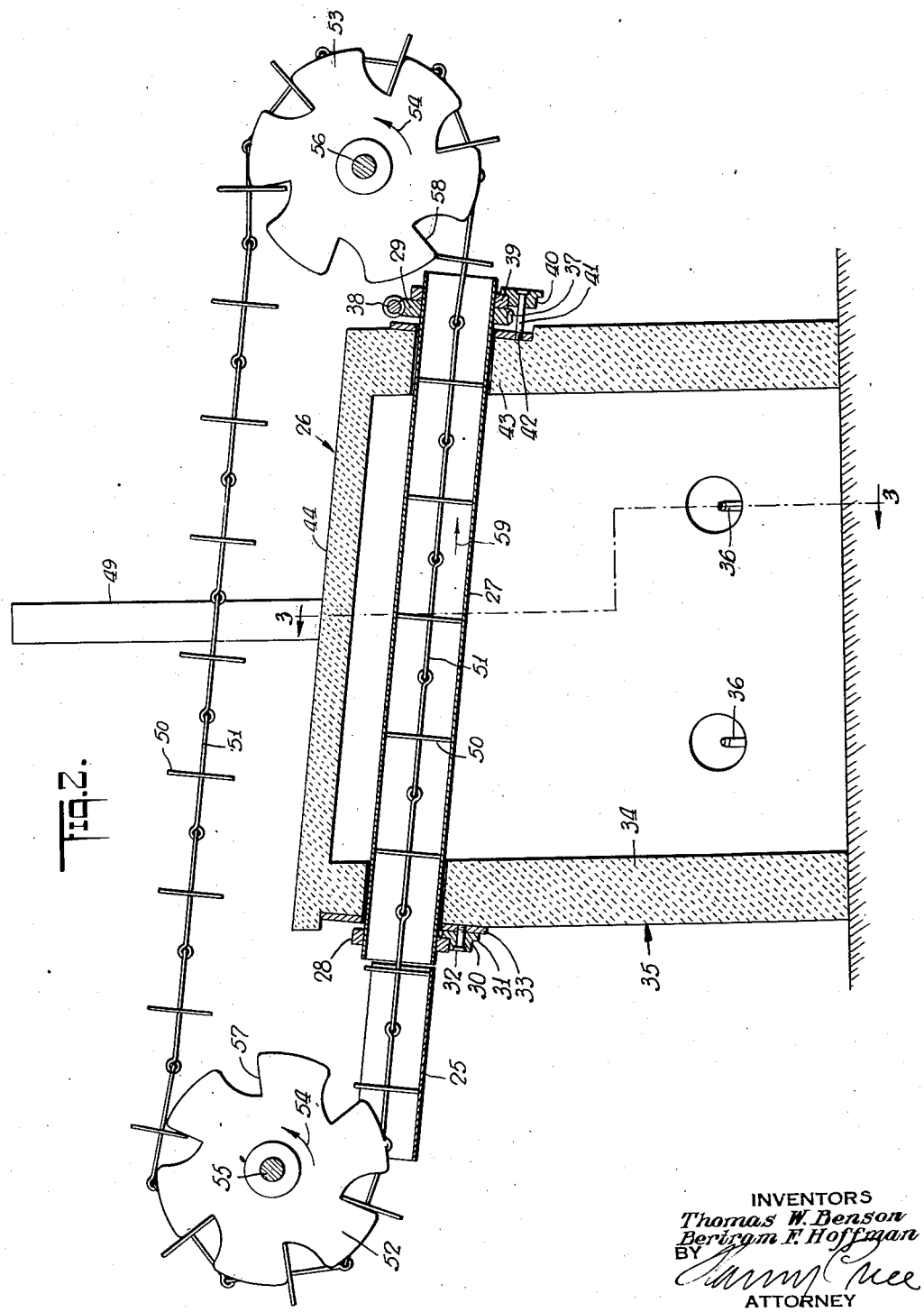

2,355,777

UNITED STATES PATENT OFFICE 2,355,777

RECOVERY OF TIN AND SIMILAR METALS

Thomas W. Benson and Bertram F. Hoffman, Philadelphia, Pa.

Application October 8, 1940, Serial No. 360,280

8 Claims. (Cl. 23—144)

The present invention relates to a method of recovering tin and similar metals from scrap containing the same.

Although the present invention will be particularly described in its application to the recovery of tin from tin plate scrap, such as used tin cans, it is to be understood that it has a broader application to the recovery of lead, tin, aluminum, chromium, vanadium, tungsten and similar amphoteric metals from scrap or waste material containing the same, particularly where such waste material is principally composed of a relatively less costly metal, as for example, steel or iron.

It has not been found most satisfactory to recover tin from tin scrap or waste tin plate by treatment with acid or by treatment with halogens, since they will often result in the production of a relatively impure tin and give low yields.

It also has not been found most satisfactory to recover these metals by hot or boiling aqueous alkali solutions.

It is among the objects of the present invention to provide an improved process of recovering tin or similar metals from scrap containing the same, and particularly from iron or steel scrap containing the same, particularly where the tin or other alkali reactive metals are in the form of surfacings, coatings or platings upon relatively less costly metal, such as, for example, iron or steel.

It is a further object to recover tin and similar metals from scrap, such as tin cans or tin plate containing the same, in which the tin will be recovered at low cost and in a relatively high state of purity.

Still further objects and advantages will appear in the more detailed description set forth below, it being understood, however, that this more detailed description is given by way of illustration and explanation only, and not by way of limitation, since various changes therein may be made by those skilled in the art without departing from the scope and spirit of the present invention.

In accomplishing the above objects, it has been found most satisfactory according to one embodiment of the present invention to first apply the solubilizing reagent, such as a caustic alkali, together with an oxidizing agent, such as sodium nitrate, sodium chlorate, or sodium bichromate, to the scrap after the scrap has been cleaned, degreased and broken up, said caustic alkali and oxidizing agent being in an aqueous solution or in fluid form.

The solubilizing reagent then is caused to thoroughly coat itself over the scrap, while the water is removed and evaporated, with the result that the solubilizing reagent or caustic alkali will be caused to fuse or flow over the scrap in moisture reduced or dehydrated condition. This will just give enough chemicals to convert all of the tin to stannate and will result in a complete combination of the tin or other metal to be recovered with the caustic alkali to form an alkali metal salt.

This alkali metal salt then may be readily recovered and the metal oxide or hydroxide may be obtained from the salt solution, if desired, by precipitation, as for example, with carbon dioxide, following which the tin oxide or other amphoteric metal oxide may be obtained in pure form by heating or calcination.

The scrap, on the other hand, from which the tin or other amphoteric material has been removed, may be washed and utilized as scrap metal.

Referring to the drawings, which show one embodiment, according to the present invention, but to which the invention is by no means restricted, since the drawings are by way of illustration and not limitation, Fig. 1 is a diagrammatic flow sheet illustrating the recovery of the tin or other similar metal and the various equipment which may be utilized for this purpose;

Fig. 2 is a diagrammatic showing of the fusion furnace device of Fig. 1, upon an enlarged scale as compared to Fig. 1;

Fig. 3 is a transverse sectional view of the furnace of Fig. 2; and

Fig. 4 is a diagrammatic showing of an alternative furnace device similar to Fig. 2.

Referring to the drawings, the scrap is prepared for treatment by macerating the cans in the macerator 10. The rolls 11 of macerator or shredding machine 10 may split them to any convenient width, say to 2 inch widths.

After the scrap passes the macerating wheels 11, it passes into the chute 12 and then into the washer 13. In the washer 13, the shredded scrap is immersed or washed in hot water containing a detergent or caustic solvent, if desirable.

The washer tank 13 has a belt 14, which elevates the scrap, as indicated at 15, to dump it into the rinsing tank 16.

In the rinsing tank 16 the scrap is washed free of the detergent or caustic solvent and thoroughly degreased and the scrap is picked up by the belt 17 and then dumped into the conditioning tank 18.

In the conditioning tank 18 the scrap may be immersed in a conditioning solution consisting of a 35 to 65% caustic alkali solution, such as caustic soda, containing from 15 to 20% of sodium nitrate.

This caustic soda is preferably first dissolved in approximately an equal weight of water and is kept at a temperature of 120 to 160° F. and then the sodium nitrate is added. The concentration of the solution is preferably so regulated that approximately 5% by weight of the caustic soda composition will cling or attach itself to the scrap upon removal from the conditioning tank 18.

It will be noted that both the washing tank 13, as well as the conditioning tank 18, are provided with heating devices indicated diagrammatically at 19 and 20 to maintain a desired temperature.

The conditioning tank 18 is supplied with the caustic alkali solution from the make-up tank 21 through the conduit 22. The scrap in the conditioning tank 18 is taken up by the moving belt 23, which has an elevated portion 24, which will dump the scrap into the receiving spout 25 of the fusion furnace 26.

The fusion furnace, as shown best in Fig. 2, has a rotating tube 27 provided with the collars 28 and 39.

The collar 28 rests upon the reduced diameter portion 30 of the roller 31, which is rotatably mounted at 32 in the support 33 on the wall 34 of the furnace 35. The collar 39 rides upon the roller 40, turning on the shaft 41 having a bearing at 42 supported on the wall 43 of the furnace 35. The other collar 29 is provided with gear teeth 37, which mesh with the worm drive 38, which drives the rotating tube 27.

It will be noted that as shown in cross section in Fig. 3, the tube 27 is positioned in the upper curved portion 44 of the furnace 35, which has the front wall 45 and the rear wall 46, which rear wall 46 receives the oil burners 36.

The upper portion 47 of the wall of the furnace is projected forwardly to force the gases to pass along the path indicated by the arrows 48 before passing out through the stack 49.

Travelling through the tube 27 are a series of plates 50, which are connected together by the linked chain 51 and which are propelled by the toothed wheels 52 and 53 rotating in the direction 54. These wheels are provided with the shafts 55 and 56 and their teeth 52 have flat sides 57 and 58 to pick up and advance the plates 50 in the manner indicated, whereby the material is kept moving in the direction 59 through the tube 27.

At the same time, tube 27 is rotated to give a uniform coating or surfacing of the caustic material.

Preferably the temperature in the rotating tube 27 is maintained at about 350 to 400° F. and air is desirably excluded from the interior of the tube as much as possible.

If desired, an inert atmosphere should be caused to flow through the rotating tube 27, together with the scrap. The time of treatment of the tin scrap within the rotating tube 27 should be sufficient to fuse the caustic alkali onto the surface of the scrap and cause the conversion of the tin into sodium stannate. A continuous rotation assures an even distribution of the caustic alkali and the sodium stannate and a uniform heating of the mass in the tube to a temperature of about 300 to 500° C.

The coating of the tin scrap by immersion or spraying with the correct amount of alkaline potassium or sodium compounds to complete the formation of the sodium stannate in the absence of a non-oxidizing atmosphere, together with the agitation or rotating of the scrap while evaporating the moisture and melting the caustic alkali and alkali metal salts to assure even and complete distribution and even heating and complete reaction is a most important feature of the present invention and results in the recovery of tin of high purity and at minimum cost.

It is desirable that a substantial amount of water be driven off during the passage through the tube 27, which also aids in displacing the air, and that the caustic alkali or alkali metal salts fuse and form a syrupy solution which thoroughly coats the tin scrap and dissolves or takes up the tin surfacing, coating or plating.

The scrap is then discharged while still hot into a tank 60 of hot or boiling water, where the sodium stannate will dissolve away from the residual scrap, leaving the sheet iron free of tin. The belt 61 will pick up the scrap and elevate it at 62 to dump it into a second rinsing tank 63. The moving belt 64 will pick up the scrap and elevate it at 65, dumping it into the steel scrap storage at 66. The water in the tank 60 will be kept boiling by the heat of the scrap while the water in tank 63 is maintained quite hot. The rinsing water enters the tank 63 at 95 and passes from tank 63 to tank 60 by the conduit 96, flowing countercurrent to the scrap.

From the steel scrap storage at 66, the scrap metal may be dumped out through the spout 67 into the baler 68, where it may be passed, as indicated by the arrow 69, to a suitable storage and sold as mild steel scrap.

The solution of sodium stannate, which is produced in the tank 60, should be regulated so that it contains about 12% of dissolved sodium stannate before it is withdrawn by the conduit 70 to the settling tank 71.

In the settling tank 71, the solution is permitted to stand to permit sedimentation of any impurities, such as any iron particles which are discharged through the spout 72. While in this tank, the solution is boiled by the steam coil 80 to precipitate the lead plumbate which is insoluble in hot solution; the precipitated plumbate is also removed through the spout 72.

The clarified solution then passes through the conduit 73 into the tank 74, where it may be evaporated to concentrate the same and to precipitate the sodium stannate, by a steam coil 90 supplied from the boiler 79 by the conduit 91. The precipiated sodium stannate may then be passed by the conduit 75 to the precipitation tank 76, to which tank water is added at 92 for dilution and to the bottom of which $CO_2$ is fed at 93 by the conduit 77 from the stack 78 of the boiler 79. The dilution aids in causing solution of sodium carbonate formed. The steam from the boiler 79 is also fed to the coils 16, 19 and 80.

The carbon dioxide which passes up through the body of liquid in the tank 76 will result in precipitation of stannic hydroxide which is then collected and passed through the conduit 81 to the ignition pan 82 and then to the furnace 83 and improver 94 to form tin metal which is removed at 84. The oil burner 95 which is supplied with steam from the boiler 79 reduces the tin from the oxide and the waste gases are used for keeping the tin in the improver 94 in molten condition to remove the granular structure.

During this procedure, however, the stannic hydroxide may be taken off at 85 and treated with acids, such as hydrochloric acid or sulphuric acid, to form tin salts or calcined ignited stannic oxide might be removed at 86.

If desired to produce an alkali-free oxide, the tin hydroxide might also be removed at the point 85, acidulated with hydrochloric acid to just render the solution acid, and then reprecipitated by sodium sulphate with boiling to obtain pure tin hydroxide, which may then be calcined to form an alkali-free oxide.

The residual solution produced in the tank 76 is wasted but the residual solution produced in the tank 74 is concentrated in the tank 87 by the steam coil 100 and then returned at 88 to the make-up tank 21, where nitre cake ($NaNO_3$) is added to produce proper proportions of sodium hydroxide and nitrate for further treatment of scrap. The nitrate helps oxidize the tin and aids the solvent action of the hydroxide.

The sodium bicarbonate formed in the tank 76, instead of being wasted, may be treated to drive off $CO_2$ which may be recovered to treat additional quantities of sodium stannate solution. The residual dissolved sodium carbonate may be converted by line to caustic soda, which can be introduced into the make-up tank 21 and then through the conduit 22 into the conditioning tank 18.

In producing metallic tin in the furnace and improver 83 and 94, the hydroxide may first be calcined to a red heat, then mixed with sufficient powdered carbon ferric oxide and silica to form a bi-silicate slag, following which the mass may be reduced in the crucible 83 by bringing it slowly up to slag-forming temperatures. After reduction, the metallic tin may be de-grained in the improver 94 and cast into bars.

When both lead and tin are present in the coating or surfacing to be removed, it may be desirable to cool the scrap after it passes out of the rotating tube 27 and then to immerse it in warm water of about 130° F., as contrasted to boiling water.

By this treatment, the iron which is removed by the caustic alkali will come down as hydrated iron oxide together with any dirt or strays on the cans, and the solution may then be filtered or decanted and brought to a boil for a short period to precipitate the lead. Then the residual solution may be filtered away from the precipitated lead and treated to remove tin hydroxide or to produce metallic tin. However, when tin alone is to be removed from the scrap, the scrap should be dumped while still at the temperature of the furnace, that is, between 300 to 400° C., into the hot rinsing solution.

Instead of using the moving plates 50, as indicated in Fig. 2, it is also possible to use various forms of screw feed or spiral fins 97 through the rotating tube 21, as shown in Fig. 4 (similarly functioning parts to those in Fig. 2 being indicated by the same numerals primed). The spiral fins or screw feed 97 prevent the conditioned tin scrap from passing straight through the tube 27' and cause it to stay in the cylinder 27' sufficiently long to be thoroughly treated. The terminal ring 98 prevents too rapid discharge of the treated scrap and also keeps the sodium stannate liquor in the cylinder 27'. It is also possible to utilize the present procedure to recover platings, coatings or surfacings of chromium, lead, aluminum and similar metals.

The hot dip rinsing, as indicated in the tank 60, is particularly of value in that it will assure complete removal of the various sodium compounds.

It will be noted that the caustic soda and $CO_2$ may be readily recovered and re-used and that there is a substantially complete recovery of the tin. By the present process as much as 70% of the reacting chemicals may be recovered.

It is thus apparent that the applicant has produced a simple, inexpensive procedure for recovering tin and similar metals from scrap containing the same, which can be used most economically with little consumption of valuable chemicals.

Many other changes could be effected in the particular features of the method disclosed, and in specific details thereof, without substantially departing from the invention intended to be defined in the claims, the specific description herein merely serving to illustrate certain elements by which, in one embodiment, the spirit of the invention may be effectuated.

What is claimed is:

1. A process of recovering tin from scrap containing the same, which comprises thinly coating a caustic alkali upon such tin scrap and fusing such caustic alkali coating upon the surface of such tin scrap to convert the tin into an alkali metal stannate.

2. A method of recovering tin materials from degreased iron or steel scrap containing the same, which comprises applying a concentrated aqueous solution of a caustic alkali, agitating said scrap while evaporating the water and while fusing the caustic alkali to form a thin molten coating upon the surface thereof and then rinsing away the alkaline tin salts that are formed.

3. A process of recovering tin from tin scrap, which comprises macerating tin scrap, washing the tin scrap, applying a solution of caustic soda and sodium nitrate to the tin scrap to form a thin molten coating thereon, placing the tin scrap in a revolving tube while subjecting it to a temperature of 300 to 400° C. in the absence of air until all of the tin has been converted into sodium stannate, rinsing the treated tin scrap to remove the sodium stannate, evaporating the rinsing solution to concentrate it and recover sodium stannate and caustic alkali, blowing carbon dioxide through an aqueous solution of said sodium stannate to precipitate tin hydroxide and to form sodium carbonate, recovering the supernatant liquid containing the sodium carbonate, recovering the caustic alkali by treatment with lime and using the caustic alkali to treat further quantities of tin scrap.

4. A process of recovering tin from scrap, which comprises fusing a thin coating of caustic soda upon the surface of tin plate at a temperature between 300 and 400° C. while excluding air.

5. A process of recovering tin from tin scrap which comprises applying a concentrated aqueous solution of sodium hydroxide and sodium nitrate to the tin scrap and evaporating the water to form a thin molten coating thereon and then heating to an elevated temperature to convert the tin into sodium stannate while agitating the tin scrap.

6. A process of recovering tin from tin scrap, which comprises immersing the scrap into a concentrated sodium hydroxide solution, placing the tin scrap in a rotating chamber and heating it to between 300 to 400° C. to evaporate the water and to form a thin fused sodium hydroxide coating thereon and to cause conversion of the tin to sodium stannate and then immersing the scrap while hot into a rinsing solution.

7. A process of recovering tin from tin scrap which comprises treating degreased scrap with a relatively thin molten coating of a caustic alkali until the tin has been converted into sodium tin salt, and then washing off the sodium tin salt and excess caustic alkali.

8. A process of recovering tin from tin scrap which comprises treating scrap with a relatively thin molten coating containing an excess of a caustic alkali and an alkali metal nitrate in the absence of air.

THOMAS W. BENSON.
BERTRAM F. HOFFMAN.